United States Patent
Barker et al.

(10) Patent No.: US 8,024,339 B2
(45) Date of Patent: Sep. 20, 2011

(54) APPARATUS AND METHOD FOR GENERATING REPORTS WITH MASKED CONFIDENTIAL DATA

(75) Inventors: Paul Andrew Barker, Watford (GB); Philip John Marson, London (GB)

(73) Assignee: Business Objects Software Ltd., Dublin (IE)

( * ) Notice: Subject to any disclaimer, the term of this patent is extended or adjusted under 35 U.S.C. 154(b) by 183 days.

(21) Appl. No.: 11/549,068

(22) Filed: Oct. 12, 2006

(65) Prior Publication Data

US 2007/0136237 A1 Jun. 14, 2007

Related U.S. Application Data

(60) Provisional application No. 60/726,449, filed on Oct. 12, 2005.

(51) Int. Cl.
*G06F 17/30* (2006.01)
(52) U.S. Cl. .................................................. 707/736
(58) Field of Classification Search .................. None
See application file for complete search history.

(56) References Cited

U.S. PATENT DOCUMENTS

| | | | | | |
|---|---|---|---|---|---|
| 5,437,024 | A * | 7/1995 | French | ............................. | 707/10 |
| 5,761,664 | A * | 6/1998 | Sayah et al. | ............... | 707/999.1 |
| 5,889,958 | A * | 3/1999 | Willens | ......................... | 709/229 |
| 5,930,764 | A * | 7/1999 | Melchione et al. | ............. | 705/10 |
| 6,182,226 | B1 * | 1/2001 | Reid et al. | ....................... | 726/15 |
| 6,279,033 | B1 * | 8/2001 | Selvarajan et al. | ........... | 709/217 |
| 6,292,811 | B1 * | 9/2001 | Clancey et al. | ............... | 715/210 |
| 6,578,037 | B1 * | 6/2003 | Wong et al. | ..................... | 707/10 |
| 6,606,627 | B1 * | 8/2003 | Guthrie et al. | .................. | 707/10 |
| 7,069,427 | B2 * | 6/2006 | Adler et al. | ........................ | 713/1 |
| 7,310,647 | B2 * | 12/2007 | Lei et al. | ........................ | 707/101 |
| 7,356,840 | B1 * | 4/2008 | Bedell et al. | .................... | 726/13 |
| 7,363,287 | B2 * | 4/2008 | Kilmer et al. | ..................... | 707/2 |
| 7,370,366 | B2 * | 5/2008 | Lacan et al. | .................... | 726/28 |
| 7,603,317 | B2 * | 10/2009 | Adler et al. | ...................... | 705/51 |
| 7,610,285 | B1 * | 10/2009 | Zoellner et al. | ........ | 707/999.007 |
| 7,644,397 | B2 * | 1/2010 | Warren et al. | ................. | 717/131 |
| 2002/0091516 | A1 * | 7/2002 | Matsuoka et al. | ........... | 704/231 |
| 2004/0034628 | A1 * | 2/2004 | Numao et al. | .................... | 707/3 |
| 2005/0278731 | A1 * | 12/2005 | Cameron et al. | ............... | 725/14 |
| 2006/0053032 | A1 * | 3/2006 | Weiler et al. | ...................... | 705/2 |
| 2006/0178998 | A1 * | 8/2006 | Kleinschmidt | ................. | 705/51 |
| 2006/0200066 | A1 * | 9/2006 | Fischer | .......................... | 604/20 |
| 2006/0218149 | A1 * | 9/2006 | Patrick | ............................. | 707/9 |
| 2007/0033203 | A1 * | 2/2007 | Nemazi et al. | ................ | 707/100 |
| 2010/0042625 | A1 * | 2/2010 | Zoellner et al. | ........ | 707/999.007 |

OTHER PUBLICATIONS

Andrew Simpson et al., On tracker attacks in health grids, year 2006, ACM , pp. 209-216.*
Osep Domingo-Ferrer et al., Efficient multivariate data-oriented microaggregation, Nov. 2006, Springer-veriag New York, vol. 15, Issue 4, pp. 355-369.*

(Continued)

*Primary Examiner* — Neveen Abel Jalil
*Assistant Examiner* — Jacques Veillard
(74) *Attorney, Agent, or Firm* — Mintz, Levin, Cohn, Ferris, Glovsky and Popeo, P.C.

(57) ABSTRACT

A computer readable medium includes executable instructions to receive a query, receive information about the identity of the query requester, send the query to at least one data source, receive data from the at least one data source, and apply confidentiality criteria to the data based on a set of rules to produce masked confidential data. The masked confidential data is returned in a report in response to the query.

19 Claims, 8 Drawing Sheets

OTHER PUBLICATIONS

Michael Leitner et al., Cartographic Guidelines for Geographically Masking the Locations of Confidential Point Data, Fall 2004,21 st Cartographic Conference, pp. 1-18.*

Rick L. Wilson et al., Protecting Data through 'Perturbation' Tecchniques: The Impact on Knowledge Discovery in Databases, Apr.-Jun. 2003, Journal of Database Management. pp. 1-13.*

* cited by examiner

APPARATUS AND METHOD FOR GENERATING REPORTS WITH MASKED CONFIDENTIAL DATA

CROSS REFERENCE TO RELATED APPLICATIONS

This application claims the benefit of U.S. Provisional Application Ser. No. 60/726,449, entitled "Apparatus and Method for Generating Reports with Masked Confidential Data," filed Oct. 12, 2005, the contents of which are hereby incorporated by reference in their entirety.

BRIEF DESCRIPTION OF THE INVENTION

The present invention relates to the processing of data to produce reports. More particularly, the invention relates to techniques for generating reports in such a manner that the risk of disclosing confidential data is minimized.

BACKGROUND OF THE INVENTION

There are a number of commercially available products to produce reports from stored data. For instance, Business Objects Americas of San Jose, California, sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike, other non-report documents that may optionally import external data within a document, a report document by design is primarily a medium for accessing and, formatting, transforming and or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets applications generally work within a looping calculation model, whereas a report generation tools may support a range of calculation models. Although there may be an overlap in the function of a spreadsheet document and a report document, the applications used to generate these documents contain instructions with express different assumptions concerning the existence of an external data source and different logical approaches to interpreting and manipulating imported data.

Confidentiality and security need to be maintained on a number of levels when data sets that contain confidential information are accessed from a database or plurality of databases. Various rules may be applied to specify what information is accessible based on various confidentiality, data protection and freedom of information policies For example, users may have certain role based rights (Role-Based Access Control-RBAC) and these rights to view a record may exist for only specific periods of time. In addition, even when a user has access to the record, certain fields within the record may be maintained as confidential sensitive personal data (SPD) from all but a required subset of the users.

Additionally, the information in a single data source may not in itself be confidential, until it is linked to data within a second (or plurality) of data sources. For example, one data source stores information about the financial or health status of an individual based on a client number and a second data source stores the personal details such as name, address, etc. and can be linked to the first data source by the common client number. The data in the first data source on its own is not necessarily confidential, but when the two data sources are linked, it becomes important to protect the information that is now linked to a specific identity based on the link between the two data sources. This issue of linked data can also exist within a single data source at the table level.

Currently, there are no reporting systems that support rigorous confidentiality constraints. Thus, it would be highly desirable to centralize data access restrictions at the level of the report query so that sensitive data that results from combining data from different sources can be identified and confidentially protected within the resulting report.

SUMMARY OF THE INVENTION

A computer readable medium includes executable instructions to receive a query, receive information about the identity of the query requester, send the query to at least one data source, receive data from the at least one data source, and apply confidentiality criteria to the data based on a set of rules to produce masked confidential data. The masked confidential data is returned in a report in response to the query.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
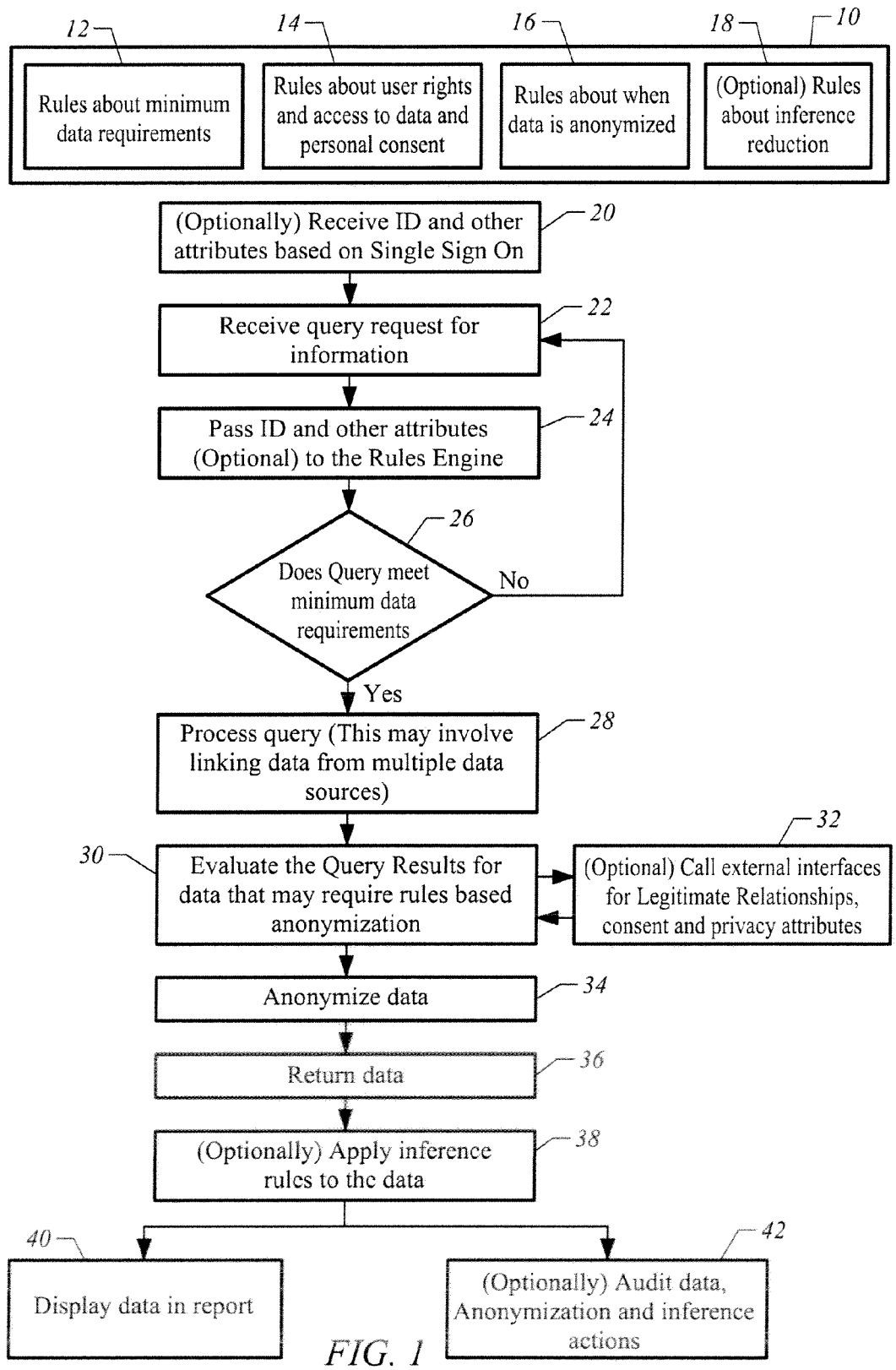
FIG. 1 illustrates processing operations associated with an embodiment of the invention.

The invention provides a systematic approach to applying rules to data access such that user and user group based security is maintained, data is confidentially suppressed based on complex criteria, rules restricting the potential inference of data are applied, and only confidential data is displayed in a report. The system incorporates role based security for the user, auditing for the system including monitoring data access, and the secure encryption of configuration files.

Confidentiality constraints can be applied to a single object, multiple objects or an entire record. The invention is applicable to many situations in which reporting is based on confidential data. A specific implementation is disclosed in relation to confidential patient data. The invention is also operable with any number of custom rules and a variety of data sources. The techniques of the invention are applicable to a large number of situations in which reports are constructed based on confidential data, such as government, military, human resources, financial, and other business contexts.

In one embodiment, the invention includes a rules entwine. The rules engine carries out pre- and post-processing for queries submitted to a database. The Business Objects system is configured with two types of files, a universe maps file and an action rules file. As used herein, a universe is a semantic layer used to describe underlying data and construct descriptions of data content that may provide common terms between different underlying data sources. An example of a semantic layer is described and claimed in commonly owned U.S. Pat. No. 5,555,403, the contents of which are incorporated herein by reference. A commercial example of a semantic layer is the semantic layer as described in Universe Designer business intelligence software commercially available from Business Objects Americas, San Jose, Calif. The invention need not be implemented using a semantic layer and/or universe. For example, the rules engine may be configured as a transparent gateway where the rules themselves contain relationship logic and the database schema model (e.g., tables and columns) is accessed directly without a universe defining the inter-relationships.

Universe maps describe objects of interest in a particular universe. The action rules file configures the rules engine and embodies the business rules for how to treat query select statements. In one implementation, the rules engine is configured with two information sources-action rules and a metadata model (e.g., the semantic layer or unified semantic layer). The action rules file configures the rules engine and embodies the rules for how to treat query metadata definitions and associated results generated by the Business Objects system.

A Business Objects query definition is analyzed by assessing objects used in the query panel and the query construction. This can also be expressed as the query results objects, conditions and their logical operators.

An embodiment of the invention may also utilize an inference engine, which carries out post-processing of the data set based on predefined rules that remove data about which inferences could be made. For example, data my be removed based on volume thresholds and threshold relationships specific to given fields in the returned query, as discussed below.

An audit engine may be used to provide configurable auditing of the inference processing and other data access details. The audit engine is typically configurable and can log on to a secure auditing database in order to maintain security for the audit files. The audit engine provides the ability to audit information on any external calls made by actions, Any universe which contains both personal and clinical data should be described by a universe map, which maps object names/keywords from the universe to fragments of SQL. This mapping is used so that the rules engine can process an SQL query to work out what data may be the subject of the action rules in the query. This mapping can optionally include classing of object names/keywords. In one implementation, the universe map is provided through metadata within an existing universe and is evaluated against the universe rather than requiring a secondary mapping file.

The action rules describe a list of rules. In one embodiment, each rule is made up of two parts—the condition and the action list. The first part of the rule describes conditions for when the subsequent list of actions should be applied in the processing of the SQL. Conditions are described by using binary and unary logical operators (e.g., AND, OR, NOT, NAND and XOR) on tests for the presence of objects (as defined in the universe map) in the SQL or Business Objects session. In one embodiment of the invention, the underlying binary and unary logic is abstracted and a Business Process Language (BPL) is applied. In one embodiment, the order of the rules in the action rules file is significant. The rules engine applies the rules in the rules list, first to last, in turn until it finds a match for the query. In one implementation, rules can be written for conditional evaluation rather than for strictly sequential evaluation. In one implementation, multiple rules/sets of rules are applied.

In one embodiment, the invention uses a configuration. The Business Objects connection server and the rules engine use this configuration file to specify options for rules settings and describes how to connect/manage (e.g., load balancing and timeouts) external interfaces for specific actions. This file is implementation specific and this configuration information could be provided using a different method.

FIG. 1 illustrates work flow associated with an embodiment of the invention. FIG. 1 illustrates a rule block 10. In this embodiment, rules block 10 includes rules about minimum data requirements 12, rules about user rights and access to data and personal consent 14, rules about when data is anonymized 16, and rules about interference reduction 18. These rules are processed as follows.

An ID and other attributes are optionally received 20. A query for information is then received 22. The query ID and optionally other attributes are then passed to the rules engine 24. If the query does not meet minimum data requirements (block 26—no), then control returns to block 22. Otherwise (block 26—yes), the query is processed 28. The query results are then evaluated for data that may require rules based anonymization 30. This may require a call to external interfaces for legitimate relationships, consent and privacy attributes 32. Confidential data is then masked or anonymized 34. The data is then returned 36. Inference rules are then optionally applied to the returned data 38. Appropriate data is then displayed in a report 40. This may involve data auditing and anonymization 42. Auditing can occur even if results are not returned to the report. Therefore, operations 40 and 42 can be performed independently.

The following detailed operations exemplify an embodiment of the invention that selectively utilizes operations of FIGS. 1.

1. The application creates a new user session, recording user attributes such as organization, role or current activity.
2. Report is Executed from the ReportServer (e.g., run or refresh).
3. Query is sent to the Connection Server.
4. Connection Server calls Governance Engine, including passing Query (SQL string or metadata model).
5. Get environment variables.
   a. Configuration variables
   b. Session variables
6. Open an Audit entry.
7. Perform variable substitution.
8. Connection server delegates evaluation of proposed Query (SQL or Metadata model) to the Governance Engine.
9. Prepare the execution plan
   a. If SQL then
      i. Walk through the Query identifying query fragments, obtain the object keywords to which they map and retain object keyword context in the query. Alternately, receive the query result condition (e.g., query definition) directly from the reporting system. In this case, one does not have to walk through the query, rather the information supplied is used. Mapping may be based on various criteria, such as the underling tables and columns, the universe (reverse engineered)/the query specification, or mapping directly based on tables/columns, The query definition may be defined based on table/column logic as defined in a semantic abstraction. Additionally, the query definition can be defined based on a semantic layer that is based on common business terms.
   b. Else
      i. Obtain object keyword and their context from the query metadata.
   c. Process the Rules to find a matching rule. based on object keywords.
   d. Build a plan based on the action list in the matched rule .
   e. Search for prepare actions and raise exception.
10. If sufficient information (e.g., unique actor ID or account number) is not included in the Query to be able to evaluate the access rights, then raise an exception to the connection server.
11. If matched rules requires an external action, prepare for communications to external interface
12. Otherwise, return control to the connection server.
13. Initiate connection server fetch loop
    a. Connection server calls database
    b. Database returns record set
    c. If DB does not return any records then exit connection server fetch loop
    For each fetch block . . .
    d. If in first fetch cycle and record set is less than array fetch size then set the small set flag (Used to enforce inference rules)
    e. Perform the plan:
       i. Do pre-actions
          1. If external action required, count new unique identifiers to be sent as requests to the external interface (unique identifiers are configured in the rules)
          ii. Raise Exception if error
       For each action in the plan . . .
       f. Check which action is to be performed
       g. Perform the appropriate action (At any point a runtime error could be called for unexpected conditions)
       h. If the action is AUDIT then set the doAudit flag to true
       i. If External Action (e.g., IECONNECTOR) then call external interface with the required attributes.
    End of action loop
       j. Do post-actions (If small set flag is true then count post-actions unique identifiers to check for inference rules—perform row deletion if necessary)
       k. If the doAudit flag has been set to true then perform the audit
14. Return the fetched record set to connection server
    End of fetch loop
15. Connection Server passes fetch block to reportserver
    End Connection Server Fetch Loop
16. Connection server performs clean up
17. Clear all memory
18. Finalize the audit footer
19. If external Interface was called, then send a termination message and close the connection.

Figure 2A:
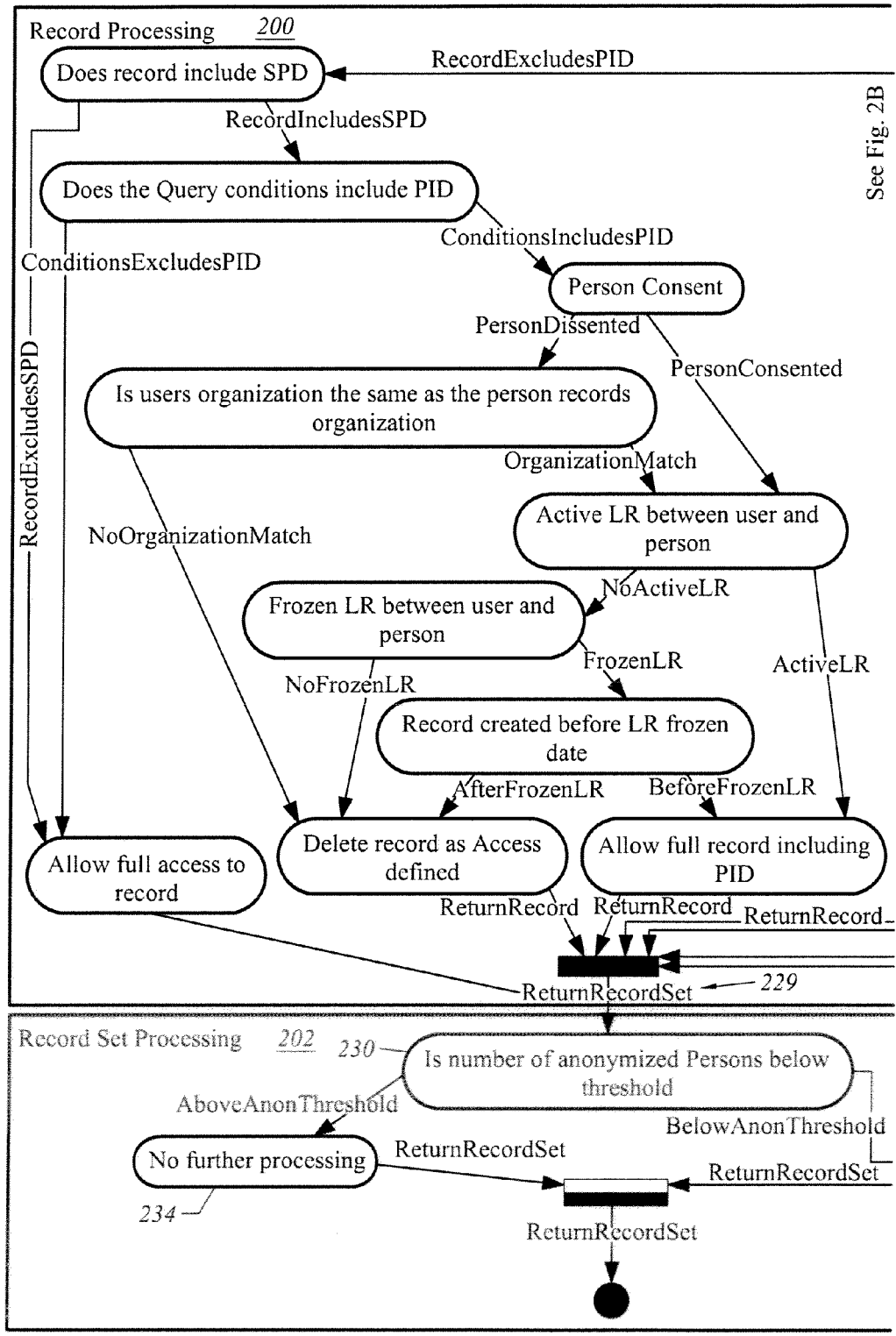
FIG. 2 illustrates an example of record set workflow in accordance with an embodiment of the invention.
Figure 2B:
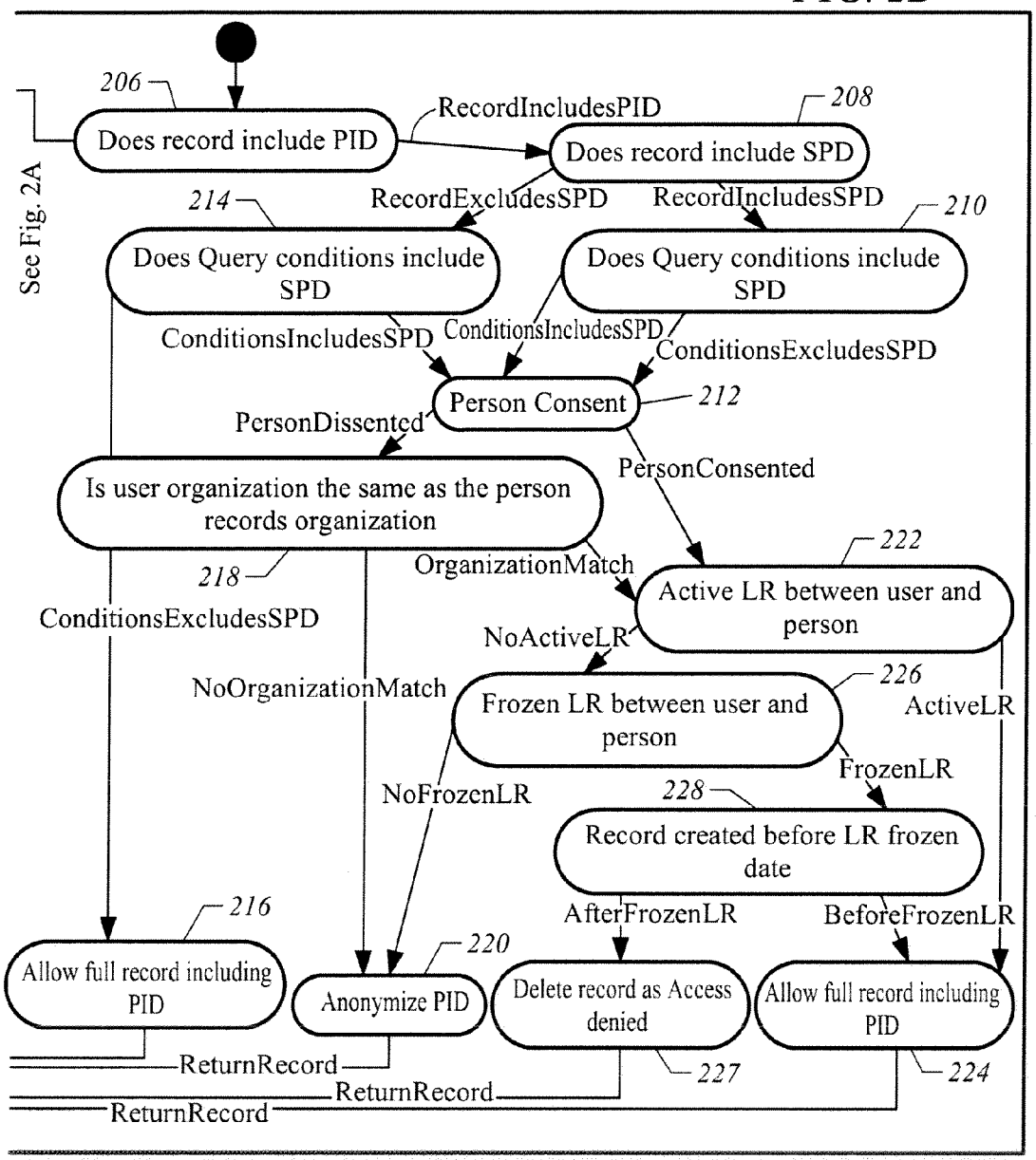
Figure 2B:
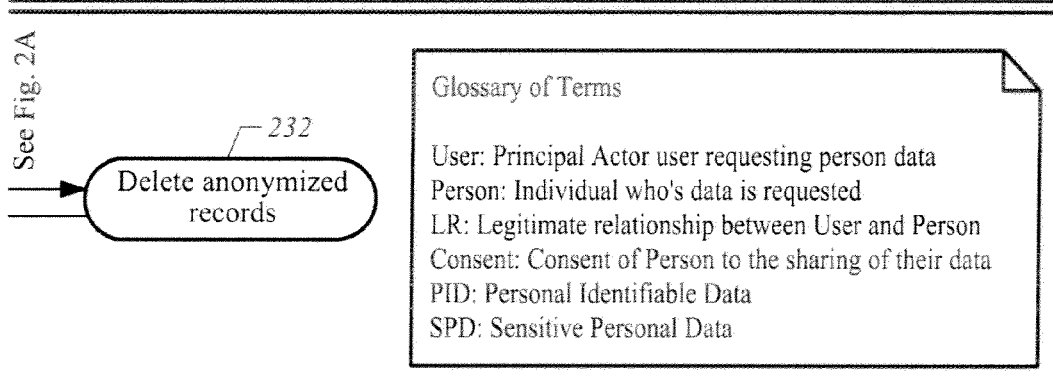

The foregoing operations are more fully appreciated in reference to FIG. 2. FIGS. 2 illustrates record processing 200 and record set processing 202 utilized in accordance with an embodiment of the invention. Initially, a record is processed to determine if it includes personal identifiable data (PID) 206. If so, it is determined whether the record includes sensitive personal data (SPD) 208. If so, it is determined whether the query conditions include SPD 210. Personal consent is then sought 212. If the record excluded SPD, the query is analyzed for SPD 214. If conditions exclude SPD, a full record with PID is supplied 216. Returning to block 212, if the person has not given consent, it is determined whether the user's organization is the same as the person's organization 218. If there is no organizational match, the data is anonymized or masked 220. If the person consented or if there is an organization match, the legitimate relationship (LR) between the user and the person is activated 222. If there is active LR, a full record is supplied, including the PID 224. If there is no active LR it is determined whether the LR is frozen between the user and the person 226. If not, the PID is masked 220. If so, it is determined whether the record was created before the LR was frozen 228. If so, the full record is supplied 224. If not, the record is deleted and access is denied 227. These actions result in a returned record set 229. Similar processing on the left-hand side of FIG. 2 also produces records for the record set 229.

Record set processing 202 includes determining whether the number of anonymized persons is below a threshold 230. If so, anonymized records are deleted 232. If not, no further records are processed 234.

Figure 3:
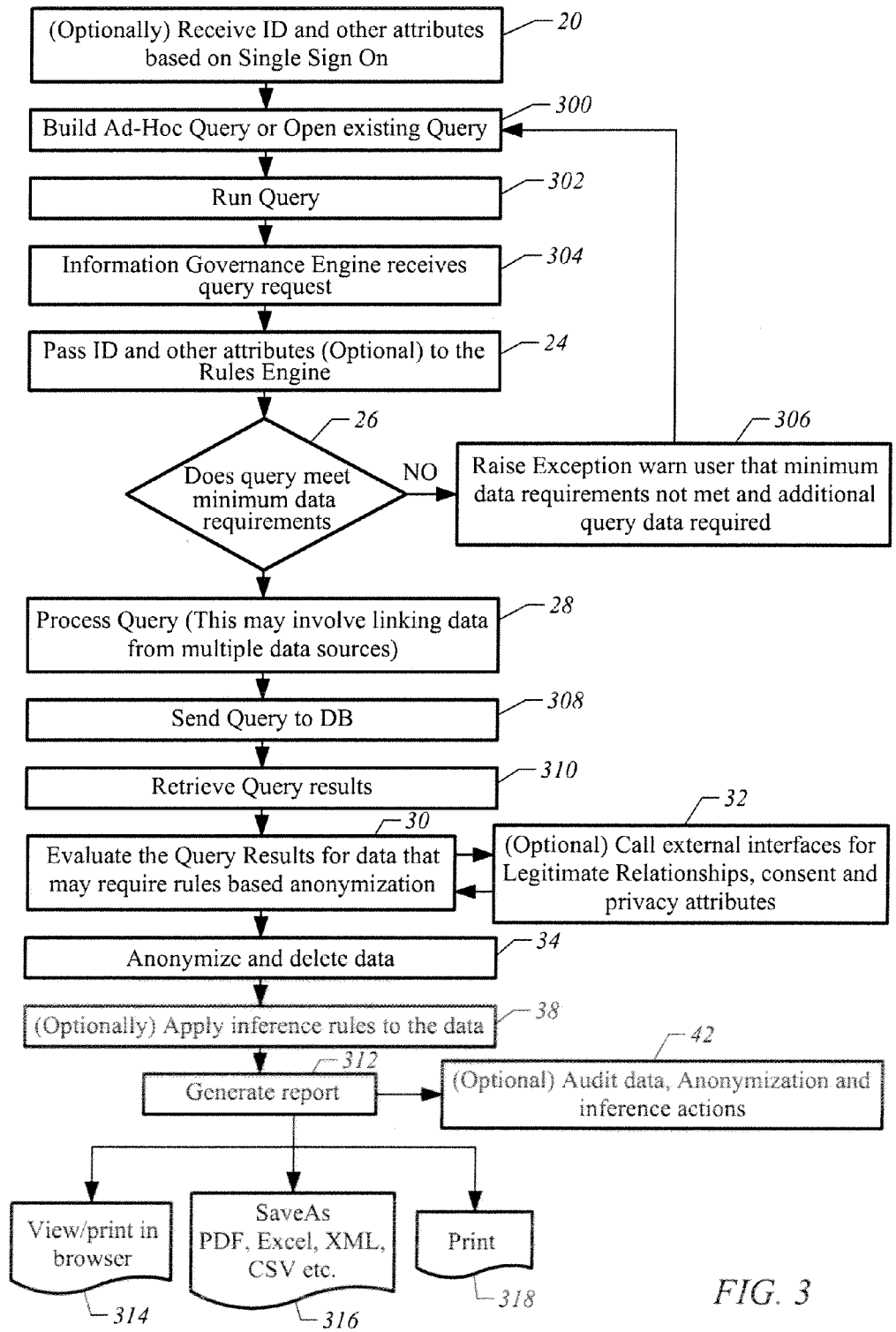
FIG. 3 illustrates ad hoc query legitimate relationship and personal consent processing operations associated with an embodiment of the invention.

FIG. 3 illustrates processing operations associated with an alternative embodiment of the invention. Many of these operations were already discussed in connection with FIG. 2. Therefore, only the new operations will be discussed. An ad hoc query is constructed 300. The query is then executed 302. The governance engine of the invention then receives the query request 304. If the query does not meet the minimum data requirement (block 26—no), then an exception is raised 306. The exception warns the user that minimum data requirements are not met and additional query data is required, with control returning to block 300. If the query does meet the minimum data requirement (block 26—yes), the query is sent to a database 308. A report may be subsequently generated 312. The report may be viewed 314, saved in a specified file format 316, or printed 318.

Figure 4:
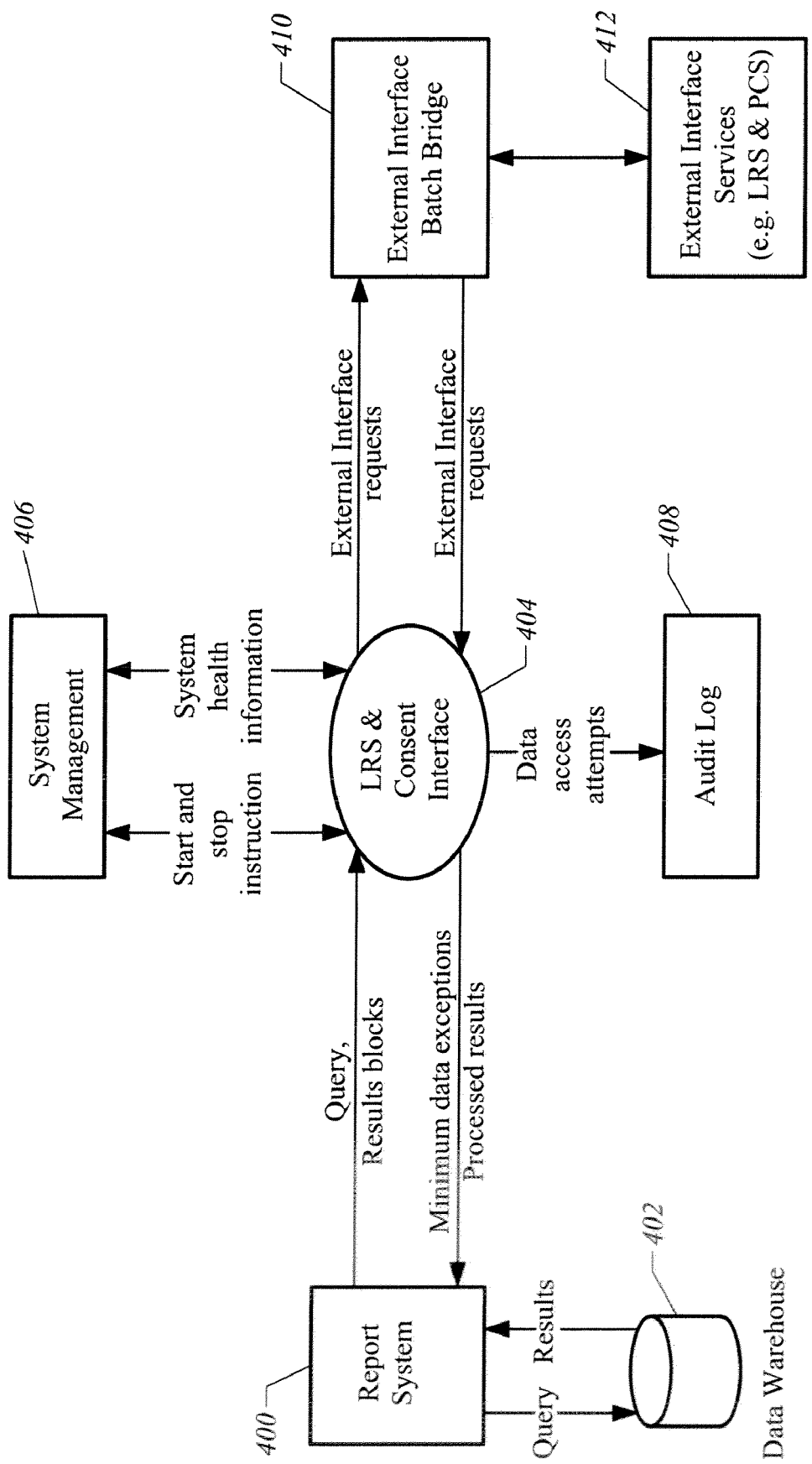
FIG. 4 illustrates a system configured in accordance with an embodiment of the invention.

FIG. 4 illustrates a system configured in accordance with an embodiment of the invention. A business objects reporting system 400 interacts with a data warehouse 402 to produce queries and results. A legitimate relationship system (LRS) and consent interface 404 provides minimum data exceptions and processed results to the report system 400. The interface 404 also receives query results from the report system 400. The interface 404 interacts with system management 406. The system management 406 exchanges information and start/stop instructions with the interface 404. The interface 404 may also generate an audit log 408. The interface 404 may also operate with an external interface batch bridge 410, which communicates with external interface services 412, such as a personal consent service (PCS).

Figure 5:
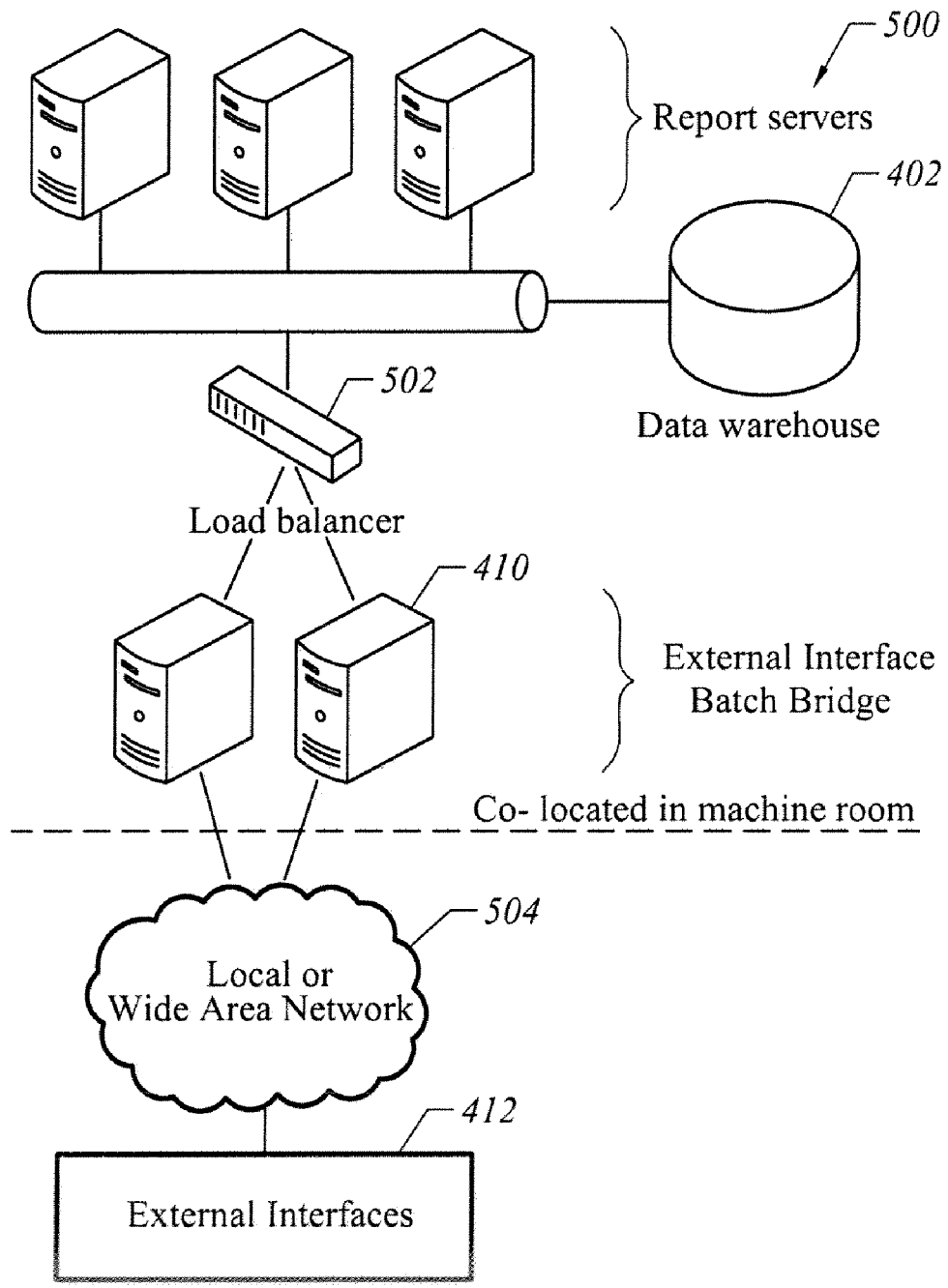
FIG. 5 illustrates a network configured in accordance with an embodiment of the invention.

FIG. 5 illustrates a system incorporating components of FIG. 4. A set of report servers 500 correspond to report system 400 The report servers communicate with a data warehouse 402 A load balancer 502 may be used with the external interface batch bridge 410. External interfaces 412 communicate with the external interface batch bridge 410 via a local or wide area network 504.

Figure 6:
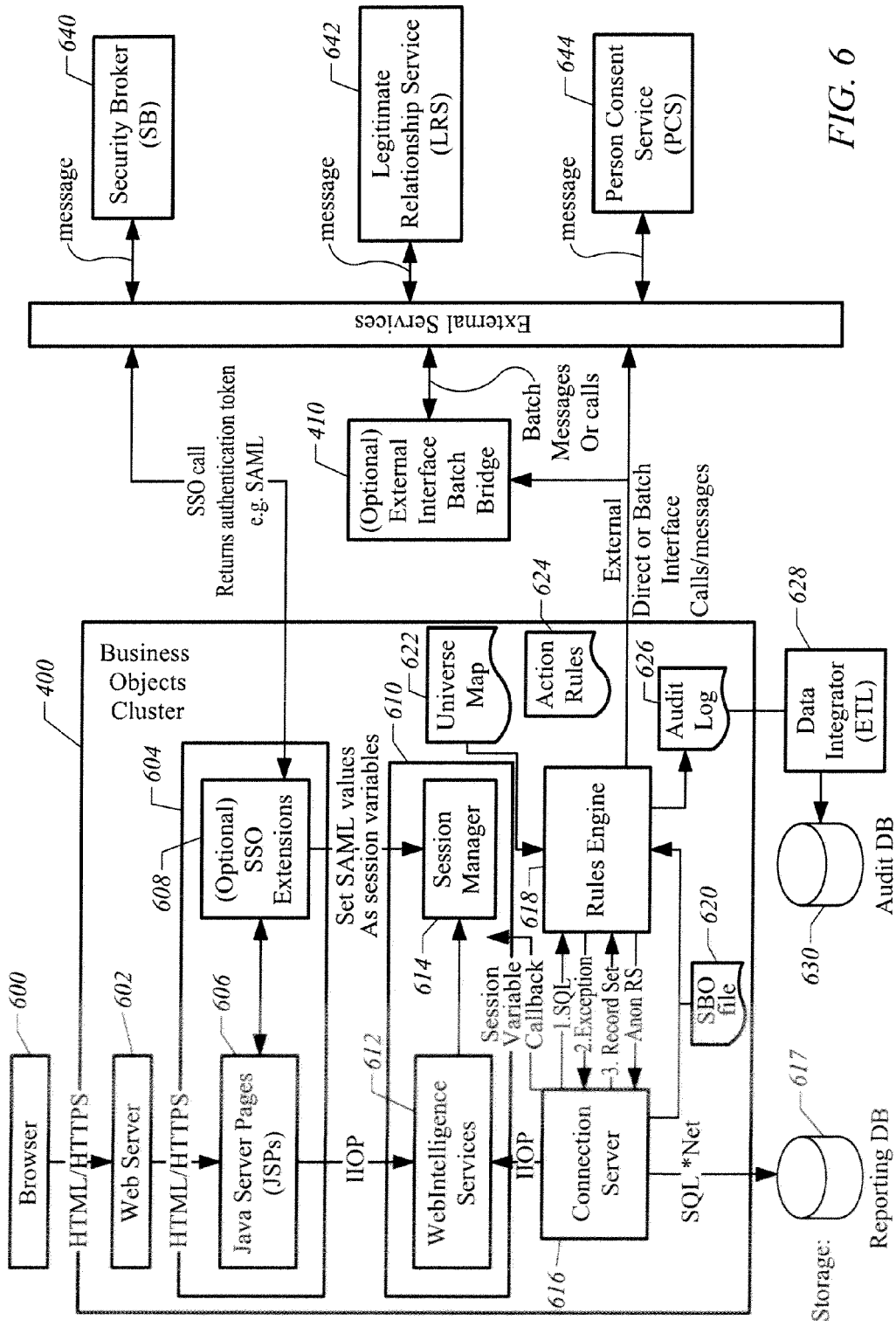
FIG. 6 illustrates a system configured in accordance with an embodiment of the invention.

FIG. 6 illustrates a system configured in accordance with an embodiment of the invention. A browser 600 (e.g., on a client machine) accesses a report system 400. In this embodiment, report system 400 includes a web server 602 that generates static content, such as HTML. The report system 400 may also include an application server 604, which generates Java server pages 606 and Single Sign On (SSO) extensions 608. The report system 400 may also be configured to include a Business Object Server 610, which implements web intelligence services 612. Web Intelligence is a product commercially available from Business Objects Americas, San Jose, Calif. The Business Objects server 610 may also include a session manager 614. The report system 400 may also include connection server 616, which communicates with a reporting database 617. A rules engine 618 of the type discussed above is configured with a configuration file (e.g., an SBO file) 620. The rules engine 618 operates with the previously described universe map 622 and action rules 624. The rules engine 618 may generate an audit log 626. An extract, transform, load (ETL) tool 628 then generate an audit database 630.

FIG. 6 also illustrates an external interface batch bridge 410, which facilitates communications with a security broker 640, a legitimate relationship service 642 and a person consent service 644. Examples of these communication are discussed in relation to FIG. 2.

In one embodiment of the invention, transactions with external services cannot be repudiated. For example, a unique key is passed and stored when initiating a call and a unique Global Unique Identifier (GUID) is received from the external services. External services that can be configured for non-repudiation include the security broker 640, the legitimate relationship service 642, and the personal consent service 644.

Figure 7:
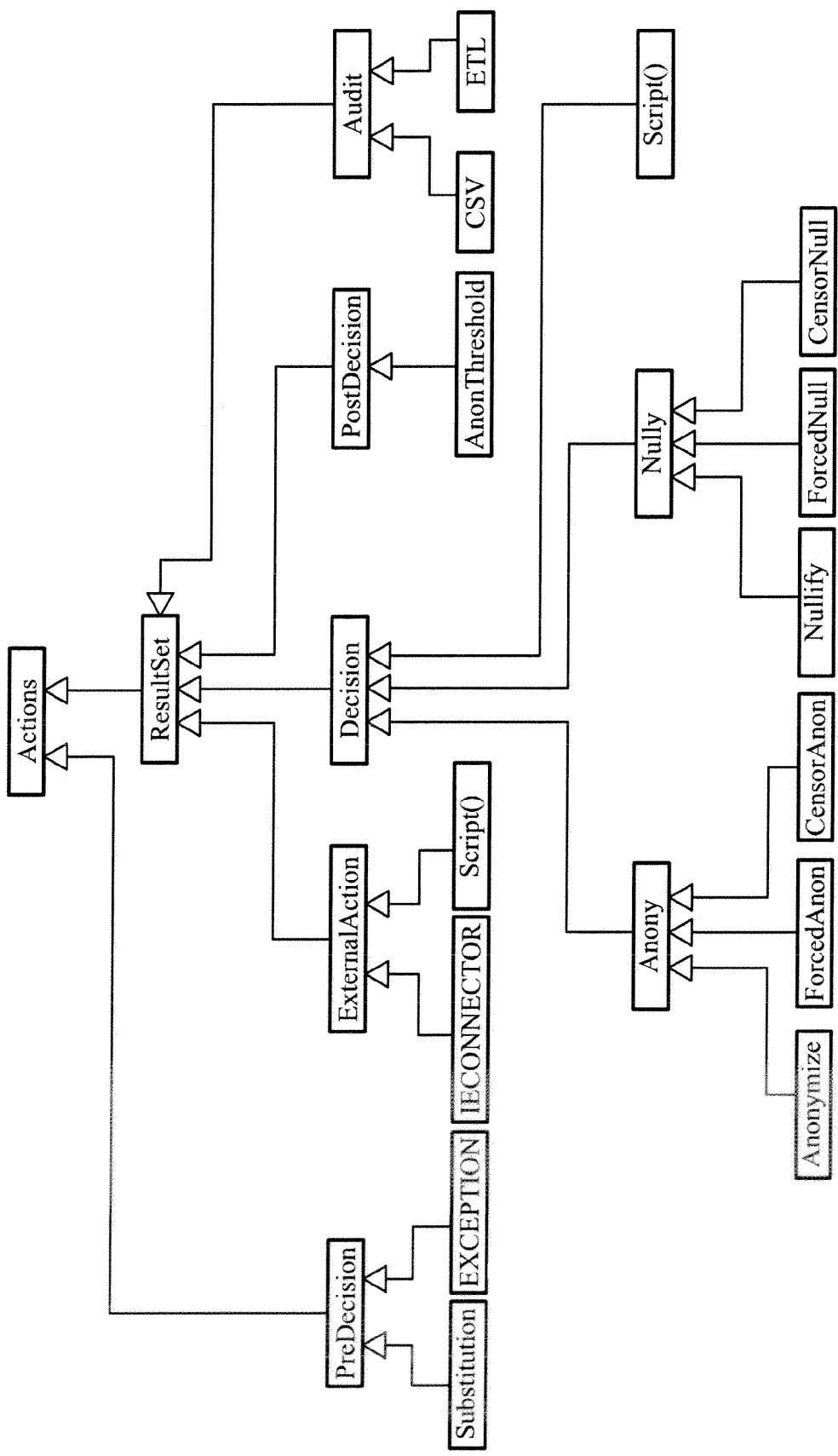
FIG. 7 illustrates a rule engine action class utilized in accordance with an embodiment of the invention.

FIG. 7 illustrates a hierarchy of actions that may be invoked in accordance with an embodiment of the invention. The individual actions are discussed below.

Pre-Decisions
  These are actions that may occur before control is returned to the Connection Server to retrieve the results of the query. Pre-decisions may be used to either modify the incoming query or to stop retrieval and communicate to the user the absence of data necessary to carry out the post result set processing.

External actions
  Retrieving data from the existing third party External Interface services depends on systems outside the Legitimate Relationship (LR) Subsystem. These may use asynchronous protocols and may time out. The IECONNECTOR action controls the calls to existing third party data services via an External Interface Batch Bridge. The action manages any communications exceptions and records the results of PCS and LKR checks for each row in the result set.

Decision
  The Decision actions operate on individual lines in the result set to anonymize, null or censor results, potentially according to the results of the External Actions.

PostDecision
  A further class of actions operates on many rows of a result set at once.
  The AnonThreshold action deletes results in cases where the number of anonymized or nulled rows falls below a parameterised proportion of the result set. This configurable action reduces the possibility that inferences can be made about identities within a small result set.

Audit
  Audit actions can be invoked to write the data required for auditing to the audit log files.

Action Descriptions
SUBSTITUTION:
  A generic feature of the engine is to replace a variable string (defined in the configuration file) with the value held by the equivalent variable name the current users available Session Manager specifies.

Exception
  This action may happen before control is returned to the Connection Server to retrieve the results of the query. It is used to stop retrieval and communicate to the user the absence of data necessary to carry out the post result set processing.

IECONNECTOR:
  This action calls the "External Interface Batch Service" requesting LR and dissent information regarding the list of unique personal identifiers in the pre-actions (Note that if no new unique personal identifiers are found in the current block then the "External Interface Batch Service" will not be called since the required information is available.) The action waits for a response from the "External Interface Batch Service" or until a timeout is reached. If a response is returned, then the LRS/PCS info ration is stored in the cache. The pre-actions will have cleared out the oldest information to store this new information if this new information will have caused the cache to overflow.

Script( )
  Custom action written in a scripting language, e.g., JavaScript. The script interface has the ability to change the record sets data, optionally using user session variables, the record set(s) data and external systems (e.g. LDAP servers) where and when required.

ANONYMIZE:
  Walks through the columns given as arguments and performs anonymization for each row in the current record set block based upon the decision tree (e.g., checks dissent status, LR status—possibly with a frozen date, may check workgroup and so on). The outcome may be to perform no anonymization or to anonymize individual columns (e.g., those defined in the arguments) or remove the whole row from the record set. The method of anonymization can be set in the configuration file (e.g., strings can be anonymized to 'XXX' and dates and numbers to NULL).

NULLIFY:
Performs exactly the same decisions based on the decision tree as ANONYMIZE, however, instead of performing anonymization of columns they are nullified.

PSEUDONYMIZE:
Implements the same decisions based on the decision tree as ANONYMIZE, however, instead of performing anonymization of columns, they are pseudonymized. In one implementation, pseudonymization can be configured to randomly insert the appropriate data type/content based on a parallel data source or the pseudonymized data can be consistently keyed to the data being pseudonymized.

FORCED_ANON:
Performs anonymization (e.g., 'XXX', NULL) of all the columns in the arguments.

FORCED_NULL:
The same as for FORCED_ANON, but nullification is performed rather than anonymization.

FORCED_PSEUD:
The same as for FORCED_ANON, but pseudonymization is performed rather than anonymization.

CENSOR_ANON:
Performs anonymization of all the columns in the third argument, if the value in the column defined in the first argument is equal to any of the strings in the second argument, e.g., CENSOR_ANON(ILLNESS, "VD#PREGNANT". (PID, ADDRESS, NUMBER)).

CENSOR-NULL:
The same as for CENSOR_ANON, but nullification is performed rather than anonymization, CENSOR_PSEUD:
The same as for CENSOR_ANON, but pseudonymization is performed rather than anonymization.

AUDIT:
Performs an audit of the actions performed on the current query. This may include user attributes, the query, timings, FETCH number, FETCH header, row number, column values, IE Connector info, and an audit string which contains all the actions performed for the current row in the record set.

Post Actions Anon Threshold
ANON_THRESHOLD(COL1, PERCENTAGE).
Action options are extensible and can support additional configuration, such as values with regard to handling aggregate values based on the anonymized, nullified, and inference AnonThreshold values.

An embodiment of the invention uses inference suppression. Even after a data set has been anonymized, a result set that contains a limited number of records may, based on the query criteria and the data that remains within the records, in effect enable the identification of confidential data. The records in the anonymized result set can be suppressed based on configurable inference values. The invention accepts a specified threshold below which records in a result set are suppressed. This value can be a % of the returned result set, a numeric record value, or a combination of a percentage and a numeric record value.

When records are suppressed in order to eliminate the possibility of inference, depending on the configuration, the resulting report either indicates that records have been suppressed in order to maintain confidentiality or contains no indication. of the suppression.

One embodiment of the invention provides configurable handling of formulas and aggregate values that are based on fields within records that have been suppressed. Options may include suppressing all aggregate or calculated values based on a group that contains suppressed records or fields used in the calculation, or creating an aggregate/calculated value based on the subset of the data that has not been suppressed and flagging within the report that the calculated value does not reflect a complete set of data, or providing calculated values that do not compromise the confidentiality of the suppressed data (see below for more details).

Anonymized or pseudonymized data within the context of a report can be configured to apply governance rules (e.g., for anonymization/pseudonymization/suppression) at various times, e.g., at view time, on refresh, or on other events, such as publication. Often data values are aggregated or have other calculations performed on them within the context of a report. In the case of missing values because data in a field or for an entire record has been anonymized, pseudonymized, nullified, or suppressed, there are a number of configurable options that can enable the provision of calculated values within the context of the report (e.g., when appropriate and not causing a breach of confidential information). Configurable options may include: suppressing all aggregate or calculated values based on a group that contains missing values, creating an aggregate/calculated value based on the subset of the data that is not missing, and optionally flagging within the report that the calculated value does not reflect a complete set of data. In addition to these options, configurable options exist around thresholds for including calculations based on missing values where a calculated value would not enable inference about any of the confidential data (such as in the case where hundreds of records had been suppressed from a large data set and the calculated value is average patient visit duration). These rules concerning calculated values based on missing values can be configured to reflect the sensitivity of various types of data within a given organization and are designed to enable administrators and researchers to access generalized data without accessing the confidential data on which it may be based.

In the case where aggregate and calculated values based on missing values can be included if rules restricting inference are met, an additional level of evaluation occurs during the query in order to retrieve these values and these values are processed on the server before being passed to the report.

In one implementation, the distribution of a report that contains secure data is restricted and additional role based permissions are required to print or distribute the report. The report may be restricted such that it can only be electronically distributed without data so that the report is refreshed based on the recipient's role and permissions and they are unable to view any saved data within the report.

The invention supports multiple validation points and the appropriate application of rules to a returned data set can be validated at various points in the process. As illustrated in FIG. 3, the invention also can restrict the processing of queries to those that meet minimum data requirements. This is applicable to the situation in which a field within the record is required to evaluate whether the user's role based privileges are valid. This field may be a date value that is used to evaluate access that is limited by time duration (e.g., the surgeon who only has access to patient data one week before and two weeks after a procedure) or based on other criteria that is used to evaluate whether the user's relationship to the data is appropriate. The fields that are required to evaluate access to data need to be included in the initial query, and the user is prompted to revise the query to meet this minimal data requirement.

Auditing is included within an embodiment of the invention in order to monitor both the operations within the system as well as interactions with the system. Auditing objects output information to the audit log such as UserID, UserRoleProfile, Workgroups(s), Query, timings, FETCH number, FETCH header, row number, Object values, IE Connector info (e.g., LRS GUID, PCS GUID, LR STATUS, Dissent STATUS etc), and an audit string which contains all the actions performed for the current row in the record set (e.g., IE Request, IE Response, Anon column 0, etc.). The auditing of timings (e.g., time spent in prepare, fetch, IE Connector and the DB) is configurable. Auditing logs can be configured to be written to a separate secure database.

The invention is extensible to support multi-lingual data sources and queries based on field mapping. The mapping is performed using a mapping file that identifies the mapping between column and field names in multiple languages. In one implementation, configuration files are encrypted in order to ensure the security of these files and prevent tampering with the application of rules and other restrictions. Data aggregation resolution can occur on either the client or server side of the processing operations.

I. GLOSSARY OF TERMS

| Abbreviation | Full Name | Notes |
|---|---|---|
| API | Application Programming Interface | A documented and supported method for accessing the capabilities of an application. |
| COTS | Commercial Off-The Shelf (software) | Software which is produced to be sold in the general market to many organizations or users. |
| CSV | Comma-Separated Values | A structured way of representing tabular data in text files. |
| DLL | Dynamic Link Library | A file which packages common functionality for use by multiple Windows applications. |
| ETL | Extract, Transform, Load | The standard three processes involved in moving data from operational systems into a data warehouse. |
| GUID | Global Unique Identifier | A unique set of symbols identifying an object or transaction. |
| IM | Information Management | The processes for collecting, cleaning and disseminating information in a controlled and secure manner. |
| IP | Internet Protocol | A standard network transport protocol. |
| LR | Legitimate Relationship | A relationship between a user and an individual/person for whom there is data (or other entity with data) which allows the user to see the individual's data or a specified portion of that data. |
| LRS | Legitimate Relationship Service | An existing third party data service which provides Legitimate Relationship information. |
| PCS | Personal Consent Service | An existing third party data service which provides information about an individual's (or other entity's) consent to, or dissent from, their information being shared between specific organizations. |
| PID | Personal Identifying Data | Data from which an individual may be identified. |
| RBAC | Role-Based Access Control | Restrictions on access to functionality or data, based on the role being performed by a user. |
| SB | Security Broker | An external service supporting specified security operations. |
| SPD | Sensitive Personal Data | Data fields that are flagged as containing sensitive personal data. Data fields regarding subjects such as a serious medical condition, criminal history, or history of bankruptcy could be flagged as sensitive personal data within a system and only be accessible on a need to know basis. |
| SQL | Structured Query Language | An industry standard language for interrogating data held in relational databases. |
| XML | eXtensible Markup Language | A structured method of representing hierarchic data in text files. |

The following discussion is directed to toward the generation of user-specific viewpoints on a relational database, The basic requirement is to tailor a query according to the user, taking into account user access rights, user relationship with the data and the nature of the query. In order to achieve this, the query must be analyzed and, using a generic model of the user's potential relationship with data, the query and the response from the query are modified. The generic model is defined in terms of a simple rule-set acting on the ingredients of the Universe.

A Universe is a meta-model of the contents of one or more relational databases. It allows a user to define queries in terms the user understands without the need to master the rather terse SQL or understand the nature of the underlying database structure. By labeling tables and attributes the user is able to reference the data they need to see in their terms. The labeled entities are related to as keywords.

The generic model (rule-set) makes use of these keywords. The full rule-set defines all of the conditions and actions that operate over the universe for all possible queries. Each query is a subset of the universe and each user has a potentially unique relationship with that data.

In analyzing a query, the initial process is to identify keywords from the universe that are found in the SQL. This requires that the SQL be parsed into its constituent clauses and the universe along with its attributes is analyzed to relate components of the SQL to their associated keyword names. At this point the query has been re-cast in terms of keywords.

When modifying a response, the rule-set (meta-model of the database) is encoded to perform some task of customization required for the dataset. For example, it is a common problem to police the data to not allow access to personal or private records. Currently, this tends to be done at the access level—thus anyone with permission gets to see all of it. But as the granularity and complexity of data increases, any individual may have a right to see some data. This requires access at the data record level—more alarming still—at the content level. A user can see their own records (a complete view of all the fields) but not anyone else's view. For example, a doctor can see his patients but perhaps not any of his colleague's patients. Or, some people may not give permission to allow anyone access except after specific permission. These problems do not have a solution in the database—they must be overlain as a layer that polices that database, The meta-model approach is to overlay a further model, which modifies access to the underlying dataset. Necessarily, it must interact with the user and a model of the database, Perhaps the simplest mechanism is to identify the contents of the query in terms of keywords. Their presence can then be used to identify and parameterize actions that need to be taken before presenting the data to the user, An example taken from medical databases where sensitive data needs to be policed will be used as an example.

A rule-set invariably consists of a condition part and an action or response part. The condition is the trigger for the response. There are two approaches that one can take with rules: (1) Check all of the conditions and trigger on any that are satisfied, and (2) Check the conditions progressively and trigger on the first that are satisfied.

In the first case, if the actions are independent, then viability and completeness are defined by a complete set of conditions being tested. However, medical databases have data that is dependent. For example, if there is no patient-data requested, but a set of rare conditions can be used to identify someone, then one can identify an individual's presence in a hospital. A rule which provides a list of conditions may be triggered, and then a further rule which identifies where these conditions are treated is also triggered.

Case 2 is harder because there is an inherent priority built in. The sequence of rules must be planned. For example, if we wish to say that for any keywords that are defined as Personal Identifying Data (PID) we will require a right-of-access check for that person for the given user (LRS check), the user's access-status will always be available. Consider the following rule.

Rule1 OR(name, Patid, address, dob, sex, phone-number): LRS(patid).

Before the colon is the condition, after are the actions with any arguments. If any of the above is true (present in the query) then do the LRS check.

The actions define the nature of the meta-model. Actions are specific to the task at hand. Each set of actions can be defined as part of the rule language and each will handle parameters in the form of columns to be altered or checked, list of keys or strings to look for, exception messages and auditing contents. They operate on the rows, part-row, contents and columns of the report. They can be combined into a sequence, and they can be parameterized by the keywords, lists of keywords, strings and filepaths. In a sequence, actions are separated by a plus sign and there is no limit on their number. The sequence is terminated by a full stop. The arguments can be checked by means of a prototype, and the action-sequence is assembled as part of the rule-evaluation process to produce a plan. The plan provides the mechanism for supplying indefinitely long argument lists and action sequences to the plan execution process.

A set of actions must span all of the specific changes that are required for modifying the response. It should then be possible to build sequences of actions to cover all possible user cases. In the example, the action LRS accesses a security database with a suitable id (returned from the medical database) to find the visibility criteria for that person (given the current user). As the number of keywords increase, the parameter lists and conditions become cumbersome. To alleviate this problem one can use classes. Assuming that there is a previously defined class Patdat (see later section to define a class) then one can re-write rule 1 as follows:

Rule 2 OR (Patdat): LRS(patid).

Any keyword from the class Patdat will trigger the rule.
If we wrote the rule with an AND instead of an OR:

Rule 3 AND(Patdat): LRS(Patid).

This would require that all members of the class Patdat be present.
Perhaps a more likely combination is:

Rule 4 AND(OR (Patdat), NOT(Patid)): exception ("Please include Patid in the select").

This specifies that there must be some PID data, but not a patid. The response is to send a message: "Please include Patid in the select". This is a high priority message (early in the list). This ensures that an exception will be raised in a situation where an LRS is expected, but there is no Patid (a Patid is required to run the action LRS, if there is any personal data then an LRS must be run).

A later rule could then be:

Rule 5 OR(Patdat): LRS(Patid)+Anonym(Patdat)+ Audit( ).

The earlier rule forces the Patdat to include Patid. The user then adds Patid and so now it flows onto the next action to do a full anonymize and audit.

It was stated that sometimes the meta-model must extend to specific contents. This means that some rules must include those specific terms in order to maintain fine control over responses. To achieve this we must search table and column data for those specific terms and apply actions to the output. For medically sensitive data we can test for the correct columns and then call the appropriate actions.

The following is an example of using the action Censor.

Censor (<from column><apply to column(s)>"<items to look for in columns>")

The from column defines the column to search for items in the list in last argument; if the item is found, then all of the columns that are present in the apply-to arg are anonymized > Rule 6 AND (illness, OR(Patdat)): LRS(patid)+censor (illness, Patdat, "#VD#pregnancy#chicken flue"))+audit( ).

The AND ensures that illness and some of the class Patdat are present. The rule (6) can occur after the check for Patid but before the more general rule to anonymize everything. In this rule there is selection to anonymize when any of the string members occur in the illness column. The items anonymized are those in the Patdat list which are present in the SQL. The generated plan tested each member in the class Patdat for "presence" before handing the parameter to be anonymized. There is another rule for anonymizing the illness column whenever the string values occur.

> Rule 7 OR(illness): censor(illness, illness "#VD#pregnancy#chicken flue"))+audit( ).

The OR simply ensures the illness is present. The illness column is checked for the strings in the last argument and if found, then the illness row value is anonymized. There is no LRS (no patid) so it could occur right at the top in which case the rule before(6) will never be seen.

> Rule 8 AND (illness, OR(Patdat)): LRS(patid)+censor (illness, (patdat, illness), "#VD#pregnancy#chicken flue"))+audit( ).

Rule 8 combines the 2 rules in that anonymizing also occurs in illness. However, it still does an LRS because its required in the OR(Patdat). Rule 7 is still a valid rule but is rather narrow. The condition did not change from 6, but the actions did change. The analysis decides what is present (and insists that it is present), then builds an action-sequence out of those ingredients to achieve (in this case) a data protection solution.

Prioritization is important to get the correct set of ingredients. It becomes a trade-off between generality and resolution. A highly specific rule will win over general rules, but if it is too high (7 beats 6) then it may be because there are more required ingredients in 6. Perhaps 6 is more general so raise it above 7, but 5 is more general in terms of actions than 6. Five is not as broad in terms of conditions as 6 so 5 is, in fact, more specific. This suggest that the order is dictated by the number of ingredients in the conditions, but the OR Boolean can radically reduce the apparent number and that should also be taken into account.

Some rules will appear to be unreachable, but it means that for a given combination of keywords (in a condition) there must be a unique action. If there are two possible actions for the same set then one cannot be a obeyed (in which case: expand the actions-sequence to subsume both rules).

The following is an example of combinatorial and Sequential Logic.

> Rule 9 AND (AND (illness, referral), OR(patid, name, address, sex)).

This can be written as follows:

> Rule 10 AND (AND(illness, OR(patid, name, addr)), AND(referral, OR(patid, name,sex)))

However, it can be simplified from 10 to 9 noting that illness gains addr and referral gains sex. This is to avoid having to mark which keys go in which arguments and hence simplify the actions list.

In one implementation, specific AND clauses transfer to specific actions or action arguments that would put an order-of-magnitude strain on the rule language. Simplification of the conditions in ways used to handle logic design—a designer can remove complexity with tools such as Boolean Algebra and even a Karnaugh's map in the extreme case. One could also construct more complex conditional logic in terms of more advanced primitives such as NAND, NOR, XOR. For example an XOR translates to OR (AND (NOT (A)), B), AND(A, NOT (B)))).

In the censor actions the previous example had only a few items to look for. There is always the possibility the list will be long. Rather than put a definitive list in the rules file, we can use a file of strings. This file will be opened by the plan and the string fed to the censor function until the end of file is reached.

The keywords used in the condition are checked for presence and that guarantees a sensible parameter list (the condition acts as a type-checker for the actions). We might expect that a file name should be similarly checked—this is the case, but we do have to identify that it is a filepath, this being achieved by a filepath identification character %.

> Rule 11 AND("% d:/BObs/TestData/InterfaceTest/testfile2.txt", "% d:/BObs/TestData/InterfaceTest/testfile.txt", name, postcode)

In the above, the condition check attempts to access the given files. If found. then it returns true else false. Thus the files must exist for the rule to be obeyed.

Multiple Rules are implemented with an analysis of the affect of all of the action sequences repetitively applied to the report in order to avoid the danger of overlap and inter-dependencies. A plan needs to be defined to rationalize the action-sequences. For example:

> Rule 12 AND(OR(patdat), illness): LRS(Patid)+Censor(illness, patdat, ". . . ")+Audit.

> Rule 13 OR(illness): Censor(illness,illness, ". . . ")+Audit.

> Rule 14 OR(patdat): LRS(patid)+Anonym(patdat)+Audit.

All 3 rules could be satisfied with members of patdat and/or illness. Rules 12 and 14 require LRS so on rule 14 we note that LRS is present and don't add another. All rules require Audit (first adds audit, rest must ignore). Rule 12 anonymizes patdat data according to illness and LRS, but rule 14 anonymizes all patdat data according to LRS, in essence the censor is redundant in 12. But the censor in 13 is self-contained and needs to exist, so the action plan should be:

> LRS(patid)+Anonymize(patdat)+Censor(illness,illness, ". . . ")+audit.

The analysis involves only the actions. The keywords only allow the action sequences to be valid (i.e., they assure us the actions will run). The intelligence is in the configuration of the actions.

The knowledge of how to configure the actions comes from knowing the data protection problem and the nature of the actions, once we have established valid keywords. That analysis could only be automated by establishing configuration rules in a plan creation process.

Automated Planning of a sequence of actions is a well known problem from Artificial Intelligence studies It can be solved in only rather limited situations. Class instruction may be used to build new keywords which substitute for a set of keywords:
class: name (<list of comma separated keywords>),
class: patdat (address, name, dob, sex, phone ).
A class is an implicit OR. If any of the names in the class are
    present then the class is defined as true in a presence test. If
    the class is empty then it is false.

A Keyword is a class, used primarily in testing, but can be used to force a keyword state:
Keyword (any-name).
any_name is now true wherever it appears, but keyword is not normally used in conditions or action-arguments.
When writing new rules there is a need to define and confine the arguments used in a given action. This may be achieved by defining a prototype for the actions. Departures from the action's argument-set can then be detected and reported to the designer.

A string may be used at the end of the Censor functions. To allow white space commas in a string the # char may be used to separate different strings. To identify a filepath-string which will have the string values stored in the file, the % separator may be used to mark the start. The ends will be either a new separator or the quote symbol ("). Since quote marks the start and finish, the quote symbol should not occur in the string. An example:

VD#pregnancy#motor neurone disease$referral % c:/dprules/referral"

The following is an example of a description of a rule language that may be used in accordance with an embodiment of the invention.
Rule Language terms (sometimes called the meta-language)
The symbol ::=is pronounced "is defined as"
The symbol pair { } means: the contents may be repeated
The symbol | is pronounce "or"
The symbol Nil means "there is nothing here"
The symbol—is pronounced "removing"
The symbol pair [ ] means: contents are a set
The symbol pair <>, means: contents is a reserved word of the language
Whitespace, tabs and newlines are generally ignored so a+b is the same as:

a+b or a+b

All other symbols and terms belong to the rule language rule ::=condition: action_sequence.

action_sequence ::=action (arglist) | {action (arglist)+}
action ::=<EXCEPTION>|<IECONNECTOR>| <ANONYMIZE> | <NULLIFY>| <FORCEDANON>| <FORCEDNULL>|<CENSORANON>|<CENSORNULL>|<AUDIT>|<DEFAULTANON>| <DEFAULTNULL> //case need not be significant
list ::=(arglist)|Nil
arglist ::=Nil|arg| {arg,}
arg ::=keyword|list|quoted_string
quoted_string ::="lstring"
lstring ::=fstring|{fstring,}
fstring ::=# | % |string
string::={char—[tab, newline, #, % ]}// blanks allowed
keyword ::={char—[blank, tab, newline]}
condition ::=op (condition_body)
op ::=<AND>|<OR>|<NOT> //case need not be significant
condition_body ::=keyword | {keyword,} |condition| {condition,}
One may also specify comments and classes.
comment ::=! {char} newline
class ::=:label (arglist). //in essence a special form of action
label ::=keyword|<KEYWORDS>//reserve class name causes all keywords on its list to be in the search list for keywords (see later section)
Because label is a keyword and so are the members of arglist, then classes can occur within classes. However, there is a danger of recursion: the defining class is in the arglist, and of co-routing: first class contains second class, second class contains first class etc. The recursive case will be avoided as the class name will not be added to the keyword list until after the class has been created. The co-routine case will be avoided by a later class-name not being present when it was established, so it will not be in an earlier class (unless pushed onto the KEYWORD list inadvertently, previously). No class can be created if it has the same name as an existing class—this prevents circumvention of the recursion by duplicating the definition.

Rule Priority—How A Rule gets Invoked

The rule, comments and classes are defined in a file loaded at run-time. The parse process has been extended to access this file and process the various lines. Thus, RuleFile ::={comment} | {rule} | {class}| EOF Comments are ignored. Classes are read and stored within an object called a Plan. Rules are evaluated until one is true. This means that the keywords in the conditions are present in the query so the action sequence can apply to that query. All subsequent rules are ignored. This now implies that there is a priority order to the rules set—the earlier the rule in the list the higher the priority.

The basic process is to find the most important rules (highest priority) that are satisfied by those keywords that are present from the SQL. The condition part of the rule performs simple Boolean operations on the presence or absence of a keyword and these are keywords which are used.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks. and magnetic tape; optical media such as CD-RO)Ms and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of. or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions, which, when executed by at least one data processor, causes the at least one data processor to perform operations comprising:
   receive a query associated with a report;
   receive information about the identity of the query requestor;
   send the query to at least one data source;
   receive retrieved data from the at least one data source;
   evaluate the retrieved data prior to displaying any retrieved data in the report, wherein the executable instructions to evaluate include executable instructions to:
   apply confidentiality criteria to the retrieved data based on a set of rules to produce masked confidential data, the masked confidential data having attached metadata that is used to evaluate whether calculations within a report are based on a minimal number of values that meet a threshold for preventing identity inference;
   modify the masked confidential data based on inference rules to produce revised masked confidential data, the modifying comprising: suppressing data records associated with the masked confidential data to prevent inferences about confidential data in a limited record set that can be used to characterize at least a portion of the masked confidential data; and
   display the revised masked confidential data in the report in response to the query;
   wherein:
      the set of rules include rules to process individual records to produce a returned record set and rules to process the returned record set; and
      the rules to process individual records include legitimate relationship rules enforcing time restrictions on legitimate relationship based access, wherein the legitimate relationship being a pre-defined relationship between a first entity and a second entity allowing the first entity to access at least a portion of data associated with the second entity.

2. The computer readable storage medium of claim 1 wherein the masked confidential data includes anonymous data generated by: performing an anonymization for each row in the retrieved data set based on a decision tree.

3. The computer readable storage medium of claim 1 wherein the masked confidential data includes pseudonymous data generated by: randomly inserting data based on a parallel data source.

4. The computer readable storage medium of claim 1 wherein the executable instructions to apply confidentiality criteria to the data include executable instructions to apply a set of rules to produce masked confidential data with deleted data.

5. The computer readable storage medium of claim 1 wherein the executable instructions to receive a query include executable instructions to receive a query based upon a request to view, refresh, distribute, or modify the report.

6. The computer readable storage medium of claim 1 wherein the executable instructions to apply confidentiality criteria to the data include executable instructions to apply a set of rules based upon subject consent to access selected data.

7. The computer readable storage medium of claim 1 wherein the executable instructions to apply confidentiality criteria to the data include executable instructions to apply a set of rules based on the identification of the individual requesting the data.

8. The computer readable storage medium of claim 1 wherein the executable instructions to receive a query include executable instructions to associate the query with the individual generating the query.

9. The computer readable storage medium of claim 1 further comprising executable instructions to audit query operations.

10. The computer readable storage medium of claim 9 wherein the executable instructions to audit query operations include executable instructions to support the exchange of unique keys to provide non-repudiation of transactions.

11. The computer readable storage medium of claim 1 wherein the rules to process individual records further include personal identifiable data rules and sensitive personal data rules.

12. The computer readable storage medium of claim 1 wherein the rules to process the returned record set include threshold evaluation rules.

13. The computer readable storage medium of claim 1 wherein the set of rules include a hierarchy of action classes.

14. A non-transitory computer readable storage medium, comprising executable instructions, which, when executed by at least one data processor, causes the at least one data processor to perform operations comprising:
   form retrieved data in response to processing of a query associated with a report;
   evaluate the retrieved data prior to displaying any retrieved data in the report, wherein the executable instructions to evaluate include executable instructions to:
      apply confidentiality criteria to the retrieved data to produce masked confidential data;
      receive information about the identity of an entity that requested the masked confidential data;
      attach metadata to records of the masked confidential data to evaluate whether calculations within a report are based on a minimal number of values that meet a threshold for preventing identity inference, the metadata indicating that the records are not displayed directly;
      modify data records associated with the masked confidential data based on inference rules to produce revised, masked confidential data, the modifying comprising: suppressing data records associated with the masked confidential data to prevent inferences about confidential data in a limited record set that can be used to characterize at least a portion of the masked confidential data, the suppressing comprising: accessing a configurable threshold specifying whether to suppress aggregate or calculated values within the masked confidential data; and
      return the revised, masked confidential data in a report format.

15. The computer readable storage medium of claim 14 further comprising executable instructions to audit authentication, data access, data validation, and data modification operations.

16. The computer readable storage medium of claim 14 further comprising executable instructions to restrict distribution and access to reports containing masked confidential data based on a recipient's role.

17. The computer readable storage medium of claim 14 wherein the executable instructions to attach metadata to records of the masked confidential data include executable instructions to evaluate whether calculations within a report are based on a minimal number of values that meet a threshold for preventing identity inference.

18. The computer readable storage medium of claim 14 further comprising executable instructions to attach metadata to records of the masked confidential data, wherein the executable instructions include executable instructions to attach information indicating that the records are selectively used in data calculations.

19. A non-transitory computer readable storage medium, comprising executable instructions, which, when executed by at least one data processor, causes the at least one data processor to perform operations comprising:
   receive a query associated with a report;
   receive information about the identity of the query requestor;
   send the query to at least one data source;
   receive retrieved data from the at least one data source;
   poll an external source to determine whether the query requestor has a legitimate relationship or has received consent to access the retrieved data, wherein the legitimate relationship being a pre-defined relationship between a first entity and a second entity allowing the first entity to access at least a portion of data associated with the second entity;
   evaluate the retrieved data prior to displaying any retrieved data in the report by applying confidentiality criteria to the retrieved data based on a set of rules to produce masked confidential data, the set of rules including rules to process individual records to produce a returned record set and rules to process the returned record set, the rules to process individual records including rules defining legitimate relationships and consents requirements, the masked confidential data having attached metadata that is used to evaluate whether calculations within a report are based on a minimal number of values that meet a threshold for preventing identity inference; and
   display the revised masked confidential data in the report in response to the query.

* * * * *